United States Patent [19]

Nilsson

[11] 4,224,831
[45] Sep. 30, 1980

[54] DEVICE FOR TRANSFERRING A ROTATIONAL MOTION INTO A LONGITUDINAL MOVEMENT OR VICE VERSA

[75] Inventor: Sven W. Nilsson, Partille, Sweden
[73] Assignee: SKF Nova AB, Gothenburg, Sweden
[21] Appl. No.: 902,827
[22] Filed: May 4, 1978
[30] Foreign Application Priority Data
  May 31, 1977 [SE] Sweden ................. 7706289
[51] Int. Cl.² .......................... F16H 27/02
[52] U.S. Cl. .......................... 74/89; 74/25; 74/424.8 R
[58] Field of Search ............ 74/25, 424.8 R, 424.8 B, 74/424.8 C, 424.8 NA, 459, 89, 89.15

[56] References Cited

U.S. PATENT DOCUMENTS

| | | | |
|---|---|---|---|
| 2,204,638 | 6/1940 | Weathers | 74/25 |
| 3,046,800 | 7/1962 | Pravel | 74/25 |
| 3,081,639 | 3/1963 | Hauptman | 74/25 |
| 3,272,021 | 9/1966 | Weber | 74/25 |
| 3,394,599 | 7/1968 | Tucker | 74/25 |
| 3,903,748 | 9/1975 | Krogsrud | 74/25 |

Primary Examiner—Lawrence J. Staab
Attorney, Agent, or Firm—Eugene E. Renz, Jr.

[57] ABSTRACT

A device for transferring a rotational motion into a longitudinal movement or vice versa. The device comprises a cylindrical shaft (1), a sleeve (2) enclosing the shaft and displaceable along and rotatable relative thereto. A cage (3) is mounted between the sleeve and shaft for axial movement with the sleeve as a unit. A plurality of rolling bodies (4) are mounted in elongated apertures in the cage and are arranged during operation to roll in a closed track around the shaft. The track has a helical portion and a recirculation portion. The rolling bodies contact the shaft and the sleeve in the helical portion and are axially moveable in the recirculation portion. Cam profile members (5, 6) are arranged at the ends of the cage for actuating the rolling bodies in the recirculation portion. The rolling bodies are arranged in the apertures in the cage in such a manner that their axes form an angle to the cylindrical shaft, this angle corresponding to the pitch angle of the helical form of the helical track portion.

15 Claims, 10 Drawing Figures

DEVICE FOR TRANSFERRING A ROTATIONAL MOTION INTO A LONGITUDINAL MOVEMENT OR VICE VERSA

BACKGROUND OF THE INVENTION

The invention refers to a device for transferring a rotational motion into a longitudinal movement or vice versa and being of the type defined in the preamble of the accompanying claim 1.

Devices of this kind are useful, e.g. as control members and as transport devices. A known device is shown in the U.S. Pat. No. 3,903,748. In this device the axes of the rolling bodies are arranged in parallel with the central cylindrical shaft. As the rolling bodies move along a helical line about the shaft it is therefore inevitable that a certain sliding must appear at the contact between the shaft and the rolling bodies, which results in friction losses and wear as the rolling bodies must be subjected to constrained guiding in their track through contact with a ramp with a surface formed as a helical line.

The purpose of the present invention is to provide a device of the above mentioned type, in which the friction losses and wear caused by the above mentioned reasons are eliminated and in which comparatively large forces can be transferred as the rolling bodies can be biased with large force between the shaft and the sleeve and can be safely and accurately guided in a cage.

This is according to the invention obtained by a device having the characteristics defined in the accompanying claim 1.

BRIEF DESCRIPTION OF THE DRAWINGS

The invention will hereinafter be further described with reference to the accompanying drawings.

DESCRIPTION OF THE PREFERRED EMBODIMENTS

Figure 1:
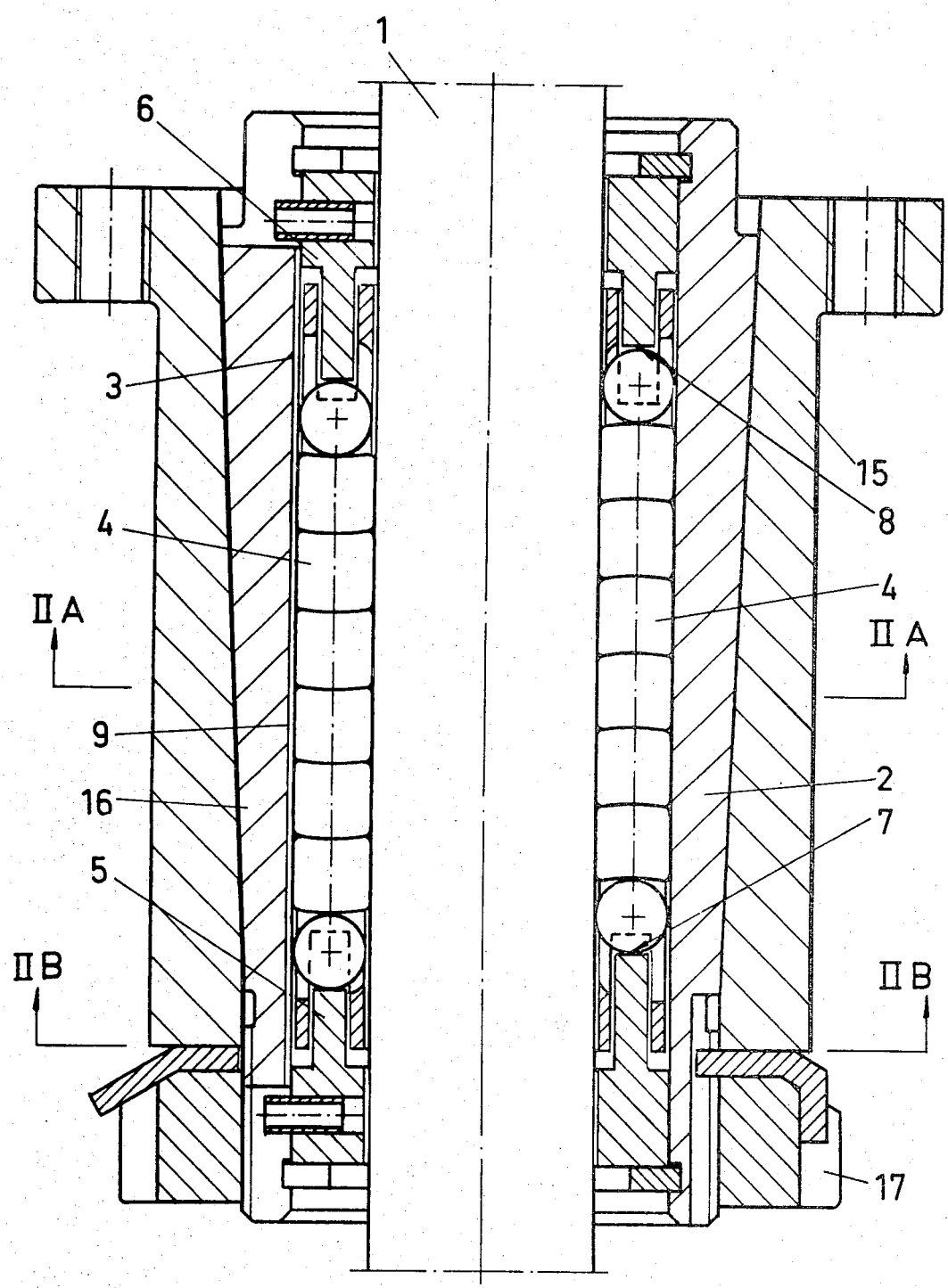
FIG. 1 shows a longitudinal section through an embodiment of a device according to the invention.
Figure 2A:
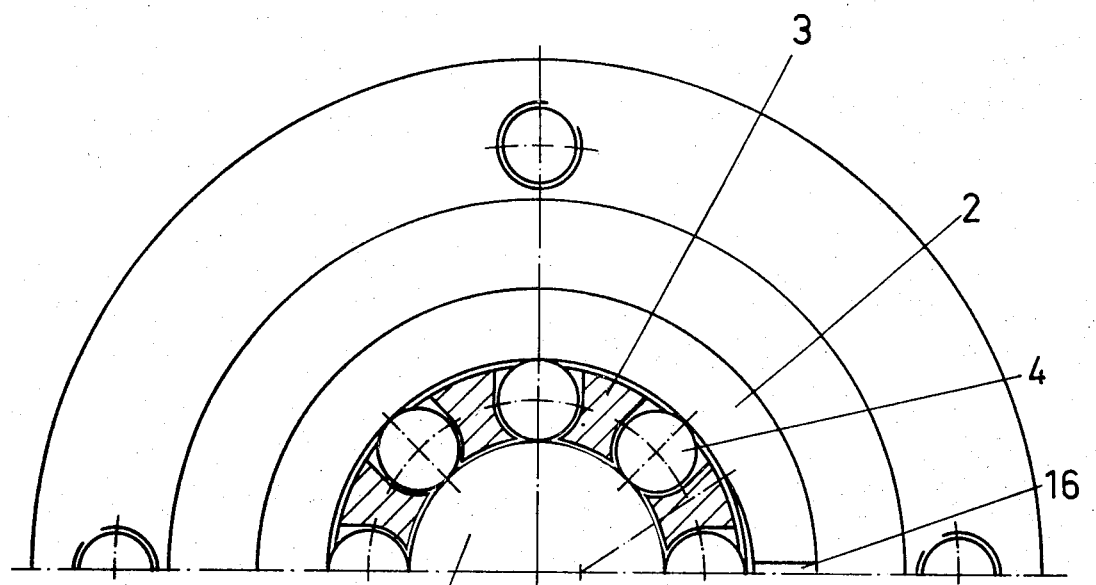
FIGS. 2a and 2b show a cross-section and an elevation resp. along lines IIa—IIb in FIG. 1.
Figure 2B:
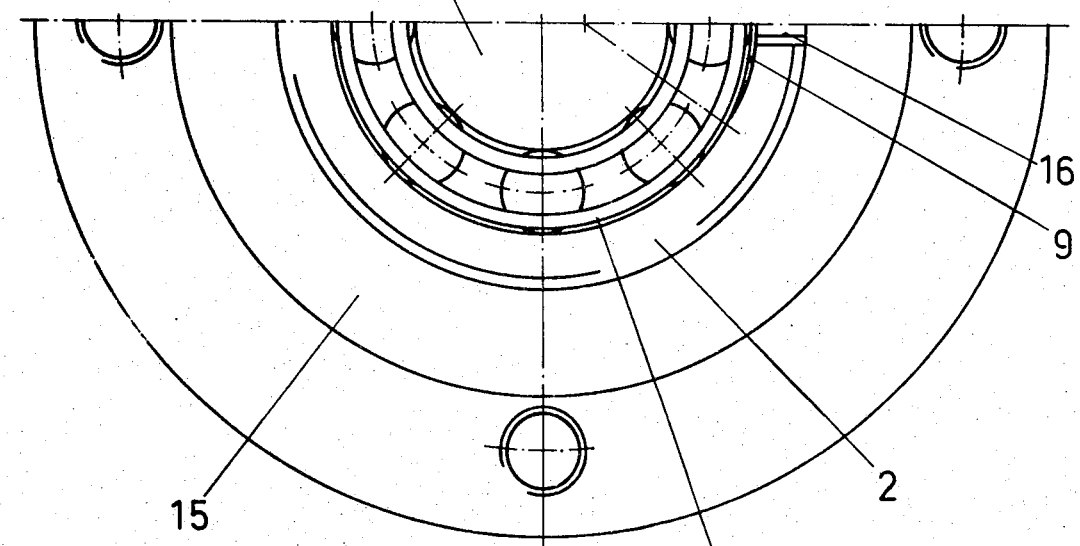

According to FIGS. 1 and 2 the device incorporates a cylindrical shaft 1, enclosed by a sleeve 2, which is displaceable and rotatable relative to the shaft 1. Between the sleeve 2 and the shaft 1 there is arranged a cage 3. The cage is formed as a sleeve with a number of elongated apertures, in which the rolling bodies 4 are arranged. The rolling bodies engage the shaft 1 and the sleeve 2 when subjected to load. During operation, i.e. when the shaft 1 rotates relative to the sleeve 2 the rolling bodies will move in a closed track around the shaft 1. The track has a helical portion, in which the rolling bodies are axially moveable. The form of the track corresponds to annular cam profile members 5, 6 arranged at the two ends of the cage 3. The cam profile members has one flank 7, 8 each, for engagement against the rolling bodies. The flanks have a radially extending surface forming a helical line 7a, 8a with a comparatively small pitch around most of the shaft 1 and a recirculation portion 7b, 8b with a large pitch, which recirculation portion connects the ends of the first mentioned helical line, the pitch angle of the recirculation portion thereby of course being opposite to the pitch angle of the helical line. The cam profile members are pushed into annular axial recesses in the ends of the cage to allow them to engage at least one of the rolling bodies in each cage aperture. When the rolling bodies engage the recirculation portion of the cam profile members they are displaced axially relative to the shaft 1 and to the sleeve 2, a distance which corresponds to the pitch of the helical track line. For ascertaining that the rolling bodies are relieved from load in the recirculation track portion the sleeve 2 is here provided with a longitudinal groove 9, which is parallel to the axes of the rolling bodies, whereby the rolling bodies can be displaced axially without being impeded by being pinched between the sleeve 2 and the shaft 1.

In the load-carrying portion of the track for the rolling bodies these can transfer forces between the shaft 1 and the sleeve 2 as the friction on one hand between the rolling bodies and on the other hand between the shaft and the sleeve will cause the sleeve and the rolling bodies to be prevented from sliding along the shaft, whereas a relative axial displacement will occur between the shaft and the sleeve when the shaft rotates in relation to the sleeve.

The apertures for the rolling bodies 4 in the cage 3 in accordance with the invention form an angle in relation to the shaft 1 and therefore has the form of the helical line. Said angle corresponds to the pitch angle for the helical line in the closed track for the rolling bodies around the shaft 1. In the helical portion of said track the rolling bodies are guided mainly by the cage 3 and primarily not by the cam profile members 5, 6 the main task of which are to lead the rolling bodies back into the load-relieved portion of the track.

As the apertures for the rolling bodies in the cage 3 have a helical form and the axes of the rolling bodies thus are arranged at an angle to the shaft 1 and the sleeve 2 it is possible for each rolling body to have only a very short contact line against the shaft 1 and the sleeve 2, if it is rigid. In the embodiment according to FIGS. 1 and 2 every cage aperture therefore is filled with a row consisting of a relatively large number of rather short cylindrical rolling bodies. Cylindrical rolling bodies are preferably used as their load capacity is comparatively large. At each end of each row of rolling bodies there is however preferably arranged a spherical rolling body as this will contact a cam profile member beside the adjacent rolling body and possibly also the shaft 1 and the sleeve 2. With such a large number of contact points in different planes it is preferable to use a spherical rolling body.

Figure 3:
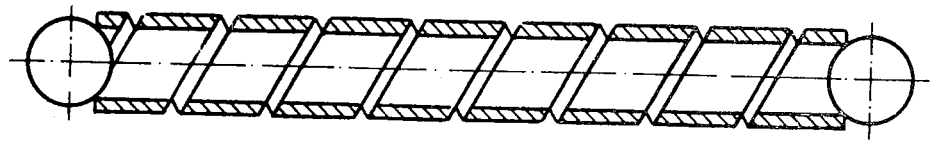
FIGS. 3, 4, 5 and 6 show different embodiments of rolling bodies for a device according to the invention.

Instead of filling each cage aperture with a large number of short rigid bodies it is possible to use elongated and flexible rolling bodies, which can be exposed to rotating bending during operation. In FIG. 3 is shown an embodiment of such a rolling body in a longitudinal section. This rolling body has the form of a helical band of elastic material, e.g. spring steel. A ball is arranged at each end of the elongated rolling body for providing contact with the cam profile members.

Figure 4:
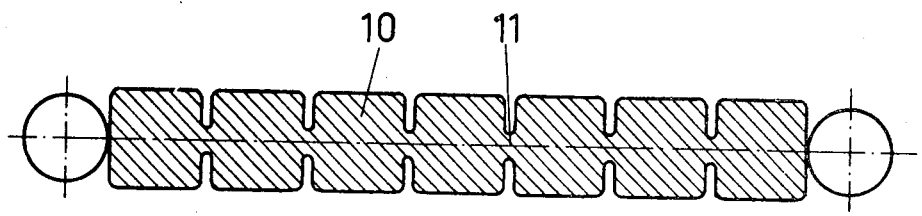

In FIG. 4 is shown a longitudinal section of a portion of another embodiment of an elongated flexible rolling body. This rolling body has a number of comparatively short cylindrical portions 10, which are spaced apart by means of slender flexible portions 11.

Figure 5:
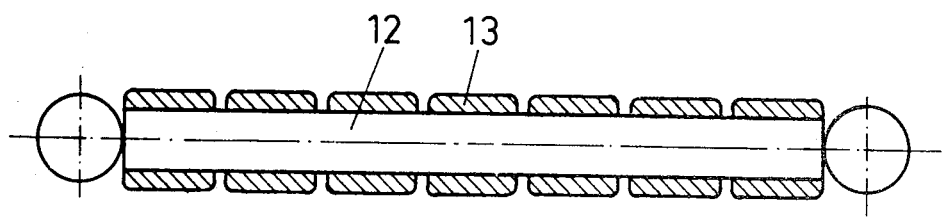

FIG. 5 shows a further embodiment of an elongated flexible rolling body. This rolling body incorporates a slender flexible rod 12 and a number of rings 13, which are arranged with small mutual interspaces on the rod, said rings having a cylindrical envelope surface and comparatively short axial extension.

Figure 6:
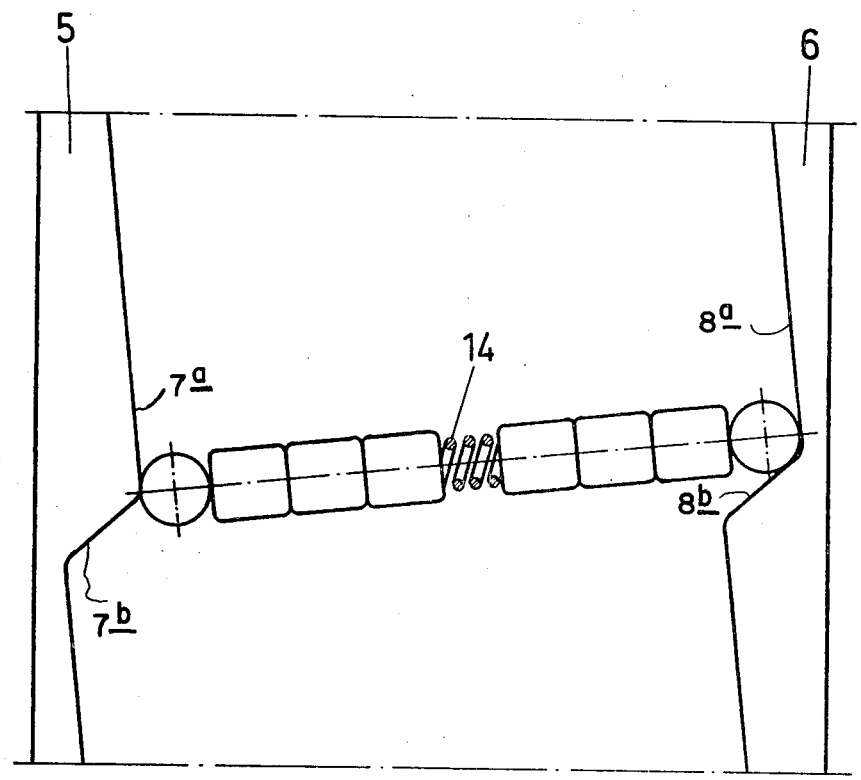

It is preferable for the sake of stability that the rolling bodies are guided axially thereby that the cam following balls at the ends of the rolling bodies engage against the cam profile members with a certain force. This can be arranged, e.g. thereby that each rolling body according to FIG. 3 is compressed axially at the assembly thus that the balls will be acted upon by a certain spring force. Another alternative is shown in FIG. 6, which shows a rolling body row between cam profile members, which have been flattened out in one plane. According to this embodiment each rolling body row is formed by a number of relatively short rolling bodies and between two of these, preferably in the middle of the rolling bodies row an elastic body 14 is arranged. This elastic body can preferably be designed as a helical spring, such as shown in the Figure, but a body of e.g. rubber can also be used. Instead of a number of separate rolling bodies at each side of the body 14 it is possible to use longer rollers e.g. of the type shown in FIGS. 4 or 5.

In order to bring about the desired radial biasing of the rolling bodies between the shaft 1 and the sleeve 2 it is possible to provide the sleeve 2 with an external tapering surface such as shown in FIG. 1, which cooperates with a tapering bore in an enclosing outer sleeve 15. The sleeve 2 is thereby preferably provided with a longitudinal slot 16 such that its bore diameter easily can be varied by driving the sleeve 15 up on the tapering surface of the sleeve 2 to different degrees. The driving up can for instance be effected by means of a nut 17, which is arranged on a threaded portion of the sleeve 2 and which engages against an end surface of the sleeve 15.

Figure 7:
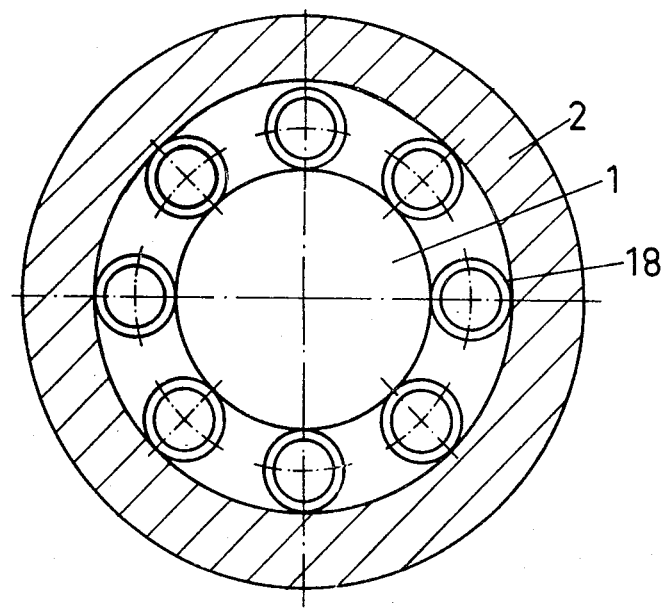
FIGS. 7, 8 and 9 show cross-sections mainly corresponding to line IIA in FIG. 1 of different embodiments of the device according to the invention.

If a constant biasing is desired it is possible to make the device such as shown in FIG. 7. In this embodiment the space between the shaft 1 and the sleeve 2 is less than the diameter of the rolling bodies when not subjected to load and the rolling bodies are radially resiliently deformable. In order to bring about an increased possibility of deformation it is possible to make the rolling bodies as more or less thin-walled tubes 18. They can for instance also be designed as shown in FIG. 3 or be made of a material with a high elasticity, whereby they are preferably homogeneous.

Figure 8:
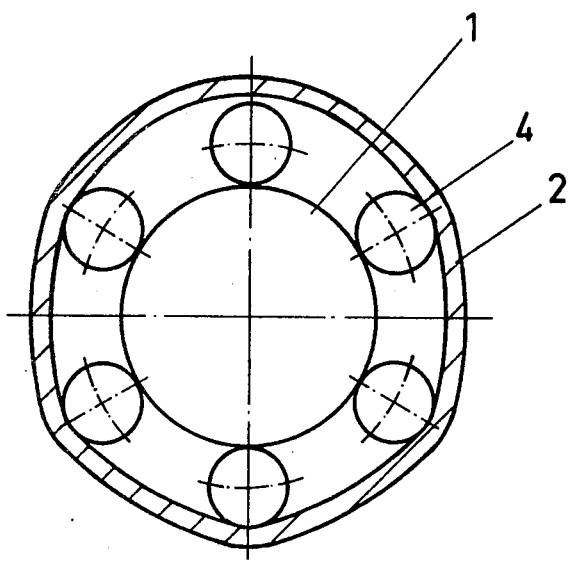

In FIG. 8 is shown a cross-section through another embodiment of the device with a constant radial biasing of the rolling bodies. The diameter of the rolling bodies 4 is here larger than the nominal space between the shaft 1 and the sleeve 2 and the sleeve is resiliently deformable such that it will receive a form, which differs from the circular-cylindrical when the device is assembled whereby internal stresses will appear in the sleeve. The profile of the sleeve will mainly receive the shape of a polygon having the corners where the rolling bodies contact the sleeve. It must thereby of course be ascertained that the shape of the sleeves is allowed to vary during operation.

Figure 9:
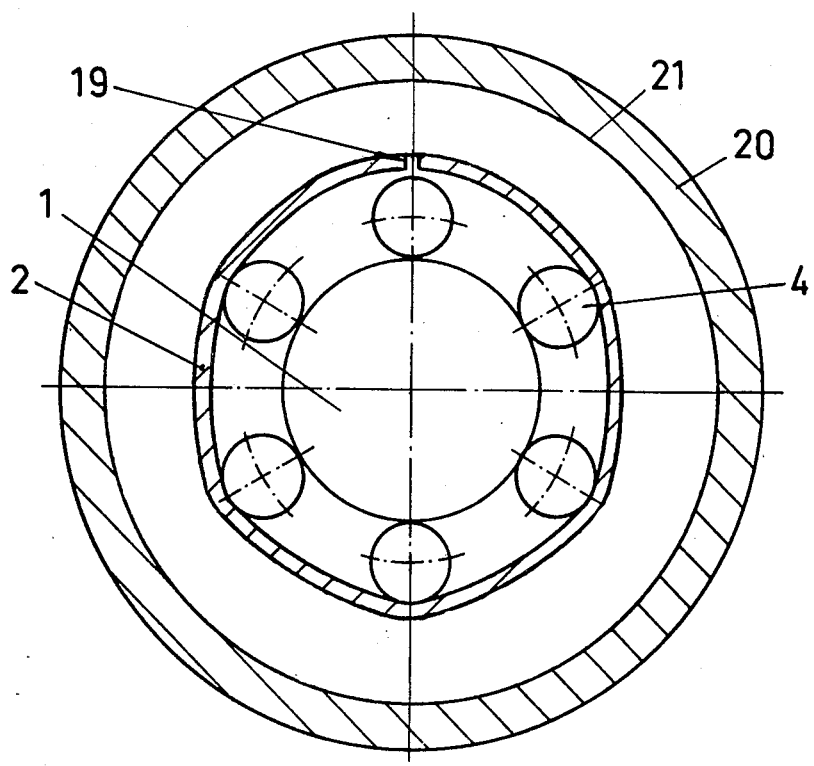

FIG. 9 shows a cross-section through a further embodiment of a device having a constant radial biasing of the rolling bodies. Also in this embodiment the diameter of the rolling bodies 4 are larger than the nominal space between the shaft 1 and the sleeve 2. Furthermore the sleeve 2 is split at 19 and it is enclosed by a rigid outer sleeve 20 and a layer 21 consisting of a highly resilient compressible material such as rubber arranged inside the outer sleeve. When assembled the split sleeve is thereby pressed against the rolling bodies by the pressure from the compressed material in the layer 21. The outer sleeve 20 will maintain its shape during operation and the device can therefore be mounted mainly in any desired manner.

I claim:

1. A device for transferring a rotational motion into a longitudinal movement or vice versa, incorporating a cylindrical shaft (1), a sleeve (2) enclosing the shaft and being displaceable along and rotatable relative thereto, a cage (3) arranged between said sleeve and said shaft, a plurality of rolling bodies (4) provided in said cage and being arranged during operation to roll in a closed track around the shaft, said track having a helical portion and a recirculation portion, said rolling bodies contacting the shaft and the sleeve in said helical portion and being axially moveable in said recirculation portion, and cam profile members (5, 6) arranged at the ends of the cage for actuating the rolling bodies in said recirculation portion, characterized thereby, that the rolling bodies are arranged in the cage in such a manner that their axes form an angle to the cylindrical shaft, which angle corresponds to the pitch angle of the helical form of the helical track portion and said cage is mounted in said sleeve for axial movement together therewith as a unit.

2. A device according to claim 1, characterized thereby, that it incorporates rolling bodies which are elongated and flexible.

3. A device according to claim 2, characterized thereby, that it incorporates rolling bodies formed as a helical spring along at least a part of its length.

4. A device according to claim 2, characterized thereby, that it incorporates rolling bodies having a number of comparatively short, coaxial cylindrical portions (10), arranged in line and spaced apart by more slender, flexible portions (11).

5. A device according to claim 4, characterized thereby, that the slender portions are defined by a thin flexible rod (12) and that the cylindrical portions are formed by rings (13) arranged on the rod.

6. A device according to claim 1, characterized thereby, that the cage has a number of elongated cage pockets, that a row of rollers is provided in each one of these pockets, and that an axially elastic and biased body (14) is arranged in an interspace between the rollers in each row, whereby the rolling bodies at the ends of each rolling body row are pressed against the cam profile members.

7. A device according to claim 6, characterized thereby, that the elastic body (14) is formed as a helical spring.

8. A device according to claim 1, characterized thereby, that the rolling bodies are biased between the cylindrical shaft and the sleeve by means of the diameter of the rolling bodies being larger than the nominal radial distance between the shaft and the sleeve and the sleeve being elastically deformable.

9. A device according to claim 8, characterized thereby, that the sleeve has a mainly circular-cylindrical shape in unloaded condition and that it when mounted is deformed by means of the contact with the rolling bodies whereby internal stresses arise in the sleeve.

10. A device according to claim 8, characterized thereby, that the sleeve is split axially and enclosed in a rigid outer sleeve (20) and a layer (2) of a highly resilient compressible material, e.g. rubber, arranged inside this sleeve, whereby when mounted the split sleeve is urged against the rolling bodies by means of the pressure exerted by said compressible material.

11. A device according to claim 1, characterized thereby, that the rolling bodies are biased between the cylindrical shaft and the sleeve by means of the radial distance between the shaft and the sleeve being less than the diameter of the rolling bodies in unloaded condition and the rolling bodies being elastically deformable in radial direction.

12. A device according to claim 1 including an elongated groove (9) on the interior peripheral surface of said sleeve which is parallel to the axis of the rolling bodies.

13. A device according to claim 1 including a plurality of circumferentially spaced elongated apertures in the cage disposed at an angle to the shaft axis and including openings at opposite axial ends of said cage through which the cam profile members project.

14. A device as claimed in claim 1 wherein the track corresponds to the cam profile member, each cam profile member having a flank for engagement by the rolling bodies, said flank having a radially extending surface forming a helical line with a comparatively small pitch and a recirculation portion with a large pitch, the recirculation portion connecting the ends of said first helical line and having a pitch opposite to the pitch angle of the helical line.

15. A device as claimed in claim 1 wherein the outer peripheral surface of said sleeve is conical and has a longitudinal slot and including an outer enclosing sleeve member having an internally tapered bore complementing the taper of said sleeve and means for selectively moving the sleeves axially relative to one another so that the bore diameter of said sleeve may be selectively varied.

* * * * *